US011262747B2

(12) United States Patent
Hoofard et al.

(10) Patent No.: US 11,262,747 B2
(45) Date of Patent: Mar. 1, 2022

(54) VEHICLE IDENTIFICATION AND GUIDANCE SYSTEMS AND ASSOCIATED METHODS

(71) Applicant: ASSA ABLOY Entrance Systems AB, Landskrona (SE)

(72) Inventors: Richard K. Hoofard, Dallas, TX (US); Daryl Day, Frisco, TX (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 93 days.

(21) Appl. No.: 16/438,347

(22) Filed: Jun. 11, 2019

(65) Prior Publication Data

US 2020/0393828 A1 Dec. 17, 2020

(51) Int. Cl.
*G05D 1/00* (2006.01)
*H04W 4/40* (2018.01)
*G07C 5/00* (2006.01)

(52) U.S. Cl.
CPC ......... *G05D 1/0022* (2013.01); *G05D 1/0038* (2013.01); *G07C 5/008* (2013.01); *H04W 4/40* (2018.02); *G05D 2201/0216* (2013.01)

(58) Field of Classification Search
CPC ............... G05D 1/0022; G05D 1/0038; G05D 2201/0216; H04W 4/40; H04W 4/029; H04W 4/80; G07C 5/008; G16Y 40/60; G16Y 20/10; G06Q 50/28
USPC .......................................................... 701/3
See application file for complete search history.

(56) References Cited

U.S. PATENT DOCUMENTS

| 4,009,051 A | 2/1977 | Kazis et al. |
| 4,286,911 A | 9/1981 | Benjamin |
| 4,476,853 A | 10/1984 | Arbogast |
| 4,590,118 A | 5/1986 | Yatabe et al. |

(Continued)

FOREIGN PATENT DOCUMENTS

| DE | 102004037933 B3 | 2/2006 |
| EP | 2215612 B1 | 8/2012 |

(Continued)

OTHER PUBLICATIONS

Dock Lighting Goes Green with the FT Ultra LED Docklight: APS Resource, News Release. 1 page.

(Continued)

*Primary Examiner* — Muhammad Shafi
(74) *Attorney, Agent, or Firm* — Perkins Coie LLP

(57) ABSTRACT

Identification and guidance systems configured to facilitate vehicle management in logistics yards or the like are described. The systems can include an identification and guidance (I/G) unit attached to each transport vehicle within the logistics yard. The I/G unit transmits information (e.g., location and guidance information) over a wireless network to a remote controller. The remote controller can transmit relevant information received from the I/G unit to a portable communications device associated with the transport vehicle to which the I/G unit is mounted. For example, the portable communications device may be located in a tractor being used to maneuver the transport vehicle about the logistics yard so that the driver can use the information displayed on the portable communications device to assist with maneuvering the transport vehicle. Related methods are also described.

19 Claims, 8 Drawing Sheets

(56) References Cited

U.S. PATENT DOCUMENTS

| | | |
|---|---|---|
| 4,626,983 A | 12/1986 | Harada et al. |
| 4,661,758 A | 4/1987 | Whittaker |
| 4,744,121 A | 5/1988 | Swessel et al. |
| 4,843,373 A | 6/1989 | Trickle et al. |
| 4,988,254 A | 1/1991 | Alexander |
| 5,026,242 A | 6/1991 | Alexander |
| 5,047,748 A | 9/1991 | Trickle |
| 5,168,262 A | 12/1992 | Okayama |
| 5,168,267 A | 12/1992 | Trickle |
| 5,181,401 A | 1/1993 | Hodan et al. |
| 5,323,098 A | 6/1994 | Hamaguchi et al. |
| 5,576,533 A | 11/1996 | Tantraporn |
| 5,775,107 A | 7/1998 | Sparkman |
| 5,831,540 A | 11/1998 | Sullivan et al. |
| 5,886,863 A | 3/1999 | Nagasaki et al. |
| 5,886,883 A | 3/1999 | Rail |
| 5,898,585 A | 4/1999 | Sirichote et al. |
| 6,082,952 A | 7/2000 | Alexander |
| 6,367,259 B1 | 4/2002 | Timm |
| 6,369,462 B1 | 4/2002 | Siri |
| 6,390,245 B1 | 5/2002 | Metz et al. |
| 6,476,572 B2 | 11/2002 | Lounsbury |
| 6,543,375 B1 | 4/2003 | Sargent et al. |
| 6,663,527 B2 | 12/2003 | Phelan et al. |
| 6,781,516 B2 | 8/2004 | Reynard et al. |
| 6,787,259 B2 | 9/2004 | Colborn et al. |
| 6,810,817 B1 | 11/2004 | William |
| 6,812,849 B1 | 11/2004 | Ancel |
| 6,917,298 B2 | 7/2005 | Romano et al. |
| 6,972,226 B2 | 12/2005 | Deppe et al. |
| 6,975,226 B2 | 12/2005 | Reynard et al. |
| 7,032,720 B2 | 4/2006 | Jette et al. |
| 7,045,764 B2 | 5/2006 | Beggs et al. |
| 7,119,673 B2 | 10/2006 | Eager et al. |
| 7,162,762 B1 | 1/2007 | Gleason |
| 7,165,486 B2 | 1/2007 | Alexander et al. |
| 7,230,819 B2 | 6/2007 | Muchow et al. |
| 7,256,703 B2 | 8/2007 | Duvernell et al. |
| 7,264,092 B2 | 9/2007 | Jetté et al. |
| 7,274,300 B2 | 9/2007 | Duvernell et al. |
| 7,333,016 B2 | 2/2008 | Ancel |
| 7,380,375 B2 | 6/2008 | Maly |
| 7,730,981 B2 | 6/2010 | McCabe et al. |
| 7,750,890 B2 | 7/2010 | Fitzgibbon et al. |
| 7,864,030 B2 | 1/2011 | Jetté et al. |
| 8,112,949 B2 | 2/2012 | Eungard |
| 8,286,757 B2 | 10/2012 | Nelson et al. |
| 8,307,589 B2 | 11/2012 | Eungard et al. |
| 8,307,956 B2 | 11/2012 | Andersen et al. |
| 8,345,010 B2 | 1/2013 | Fitzgibbon et al. |
| 8,407,842 B2 | 4/2013 | Story et al. |
| 8,490,669 B2 | 7/2013 | Fletcher et al. |
| 8,497,761 B2 | 7/2013 | McNeill et al. |
| 8,510,888 B2 | 8/2013 | Eungard |
| 8,547,234 B2 | 10/2013 | Maly et al. |
| 8,590,087 B2 | 11/2013 | Swessel et al. |
| 8,590,674 B2 | 11/2013 | Jette et al. |
| 8,775,710 B1 | 7/2014 | Miller et al. |
| 8,893,764 B2 | 11/2014 | Vohla et al. |
| 9,564,072 B2 | 2/2017 | Senfleben et al. |
| 2002/0089427 A1 | 7/2002 | Aratani et al. |
| 2003/0167238 A1 | 9/2003 | Zeif et al. |
| 2005/0102042 A1 | 5/2005 | Reynard et al. |
| 2005/0126081 A1 | 6/2005 | Patel et al. |
| 2006/0137261 A1 | 6/2006 | Maly |
| 2006/0181391 A1 | 8/2006 | McNeill et al. |
| 2007/0157614 A1 | 7/2007 | Goldman |
| 2007/0283806 A1 | 12/2007 | Morrison |
| 2008/0011799 A1 | 1/2008 | Chang |
| 2008/0022596 A1 | 1/2008 | Boerger et al. |
| 2008/0127435 A1 | 6/2008 | Maly et al. |
| 2008/0143290 A1 | 6/2008 | Chavakula |
| 2010/0073197 A1* | 3/2010 | Eagleton ............... H04Q 9/00 340/945 |
| 2010/0146719 A1 | 6/2010 | Swessel et al. |
| 2011/0075441 A1 | 3/2011 | Swessel et al. |
| 2011/0203059 A1 | 8/2011 | Whitley et al. |
| 2012/0025964 A1 | 2/2012 | Beggs et al. |
| 2012/0304558 A1 | 12/2012 | Iglesias et al. |
| 2013/0038731 A1 | 2/2013 | Brey et al. |
| 2013/0188050 A1 | 7/2013 | Winget |
| 2013/0327914 A1 | 12/2013 | McNeill et al. |
| 2013/0332217 A1 | 12/2013 | McNeill et al. |
| 2014/0075842 A1 | 3/2014 | McNeill et al. |
| 2014/0137447 A1 | 5/2014 | Mama |
| 2014/0247347 A1 | 9/2014 | McNeill et al. |
| 2015/0047132 A1 | 2/2015 | Sveum et al. |
| 2015/0047133 A1 | 2/2015 | Sveum |
| 2016/0368489 A1* | 12/2016 | Aich .................. B60T 7/18 |
| 2017/0043967 A1 | 2/2017 | Walford et al. |
| 2017/0106794 A1* | 4/2017 | Constantine ......... B60Q 5/006 |
| 2017/0320685 A1 | 11/2017 | Hoofard et al. |
| 2018/0278897 A1 | 9/2018 | Seaman et al. |
| 2019/0002216 A1 | 1/2019 | Walford et al. |
| 2020/0133259 A1* | 4/2020 | Van Wiemeersch ........ G05D 1/0088 |
| 2020/0334631 A1* | 10/2020 | Conlon ............ G06Q 10/0833 |

FOREIGN PATENT DOCUMENTS

| | | |
|---|---|---|
| EP | 2660170 A1 | 11/2013 |
| FR | 2869470 A1 | 10/2005 |
| WO | 2006066013 A2 | 6/2006 |
| WO | 2006076538 A2 | 7/2006 |
| WO | 2008014026 A1 | 1/2008 |
| WO | 2009070509 A1 | 6/2009 |
| WO | 2010077977 A1 | 7/2010 |
| WO | 2011037839 A1 | 3/2011 |
| WO | 2015023666 A1 | 2/2015 |
| WO | 2015023669 A1 | 2/2015 |
| WO | 2015166339 A1 | 4/2015 |
| WO | 2016007321 A1 | 1/2016 |

OTHER PUBLICATIONS

Pentalift introduces industry's first solar powered dock leveler! www.pentalift.com, Jun. 14, 2011, 1 page.
APS&GO—LED Communication System Specification Sheet, APS Resource, For APS1102, Nov. 2009, 2 pages.
Energy Saving Products Brochure, APS Resource, Mar. 2009, 4 pages.
FT Ultra LED Flex Arm Docklight Specification Sheet, APS Resource, Form APS 1168, Nov. 2009, 2 pages.
High Impact LED Dock Light Specification Sheet, APS Resource, Form APS1171, Nov. 2009, 2 pages.
Kelley Company; Vehicle Restraints brochure; 2008 ; 8 pages.
Kelley Company; product brochure; 2008; 8 pages.
Manual and Automatic Light Communication Systems, User's Manual, Serco, Oct. 2009, 28 pages.
Model G307K2 Kadet 2 Operator Interface with 7" TFT Display, Red Lion Controls, Inc., Nov. 23, 2015, 4 pages.
Rite-Hite Corporation, Rite-Vu Light Communication Systems Brochure, 6 pages [Not dated].
Safety & Lighting Products Brochure, APS Resource, Sep. 2004, 2 pages.
Serco Vehicle Restraints brochure; 2008; 4 pages.
Serco Loading Dock Solutions brochure; 2008; 8 pages.
Smart Power Systems International GmbH, Web pages for Hybrid DC/AC Power Supply, Jun. 1, 2004.

\* cited by examiner

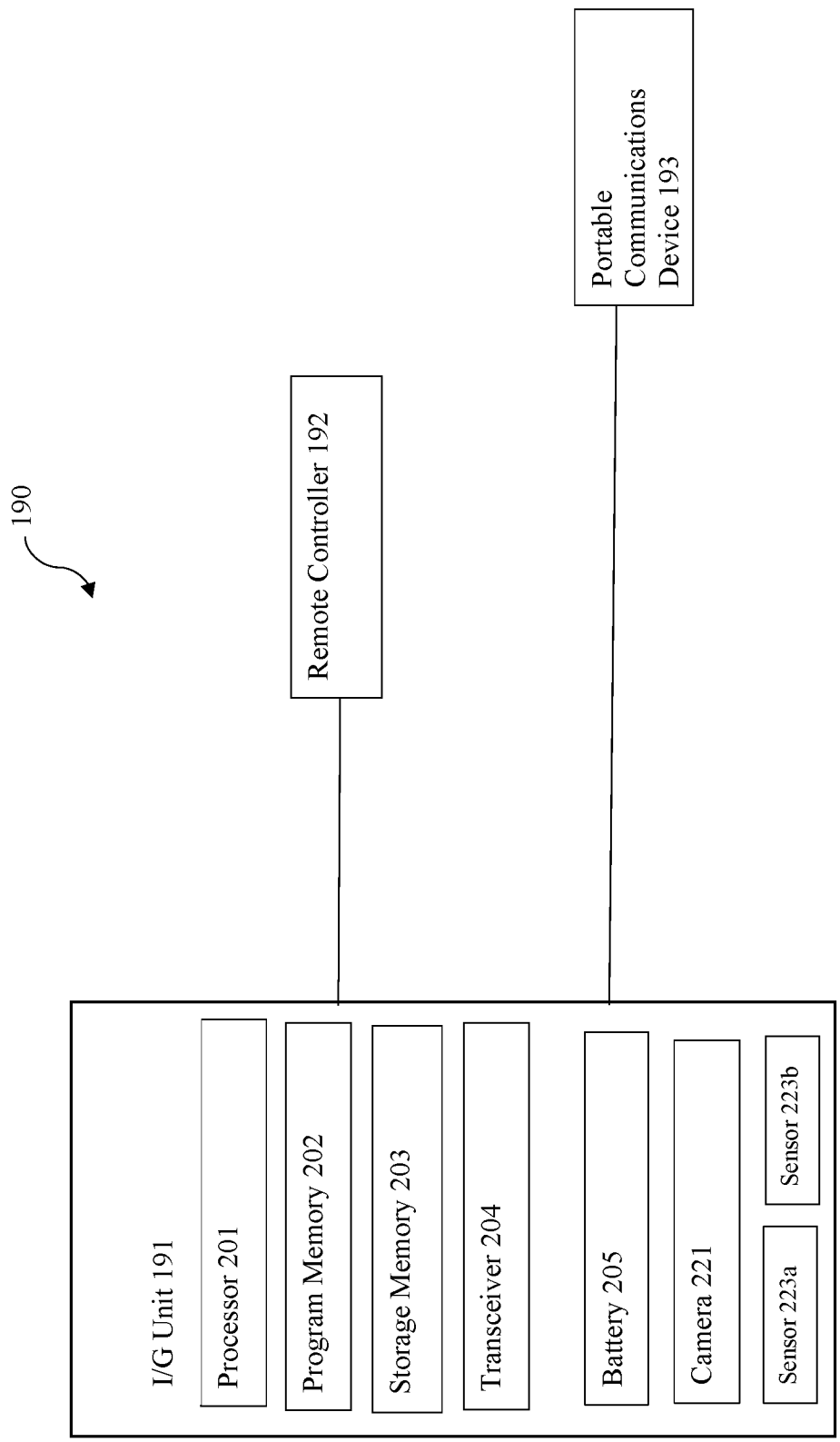

VEHICLE IDENTIFICATION AND GUIDANCE SYSTEMS AND ASSOCIATED METHODS

TECHNICAL FIELD

The following disclosure relates generally to systems and methods for identifying and guiding transport vehicles in logistics yards and the like.

BACKGROUND

Commercial enterprises typically utilize distribution, processing, and/or manufacturing centers for a variety of purposes. Distribution centers, for example, are often used to receive, process, and/or re-ship units, parcels, and other goods and materials. Manufacturing centers typically require the delivery of consumable materials and the shipment of finished products. Regardless of their specific function, distribution, processing and manufacturing centers may include a warehouse or other industrial building having one or more loading dock stations, a perimeter barrier, a gated entrance and/or exit, and parking or staging areas where idle transport vehicles may be parked. For ease of reference, such areas may be referred to herein as a "logistics yards."

A common feature of logistics yards is that transport vehicles are entering, moving within, and exiting the logistics yard throughout the day. For example, even moderate-size logistics yards typically include numerous loading dock stations that see a great deal of inbound and outbound traffic and require coordinated use. As a result, it is often necessary to keep detailed tracking information for each transport vehicle within logistics yards that include numerous transport vehicle parking spaces or staging areas. Maintaining detailed tracking information may also be important when some or all transport vehicles within the logistics yard look alike.

As used herein, the term "transport vehicle" broadly refers to any type of vehicle capable of storing and transporting goods. Transport vehicles include, for example, over the road (OTR) trailers (typically towed by an OTR tractor or dedicated logistics yard tractor) as well as transport vehicles permanently integrated with a towing vehicle (e.g., U-Haul trucks or UPS delivery trucks). Regardless of the specific type of transport vehicle, the transport vehicle is typically maneuvered within the logistics yard by a driver. Drivers maneuvering transport vehicles within a logistics yard may benefit from various types of assistance, especially with respect to aligning a transport vehicle at a loading dock station. Previously disclosed maneuvering and parking aids include U.S. Pat. No. 9,623,859, titled TRAILER CURVATURE CONTROL AND MODE MANAGEMENT WITH POWERTRAIN AND BRAKE SUPPORT; U.S. Pat. No. 9,656,691, titled METHOD FOR PERFORMING AN AT LEAST SEMI-AUTONOMOUS PARKING PROCESS; U.S. Pat. No. 9,623,859, titled TRAILER CURVATURE CONTROL AND MODE MANAGEMENT WITH POWERTRAIN AND BRAKE SUPPORT; U.S. Pat. No. 8,364,334, titled SYSTEM AND METHOD FOR NAVIGATING AN AUTO VEHICLE USING LASER DETECTION AND RANGING; U.S. Pat. No. 9,283,935, titled RAIL GUIDED VEHICLE SYSTEM; U.S. Pat. No. 8,978,562, titled RAIL GUIDED VEHICLE SYSTEM; U.S. patent application Ser. No. 15/408,242, titled METHOD AND DEVICE FOR MONITORING AN AUTONOMOUS DRIVING OPERATION OF A MOTOR VEHICLE WITHIN A PARKING FACILITY; U.S. patent application Ser. No. 15/450,210, titled TRAILER CURVATURE CONTROL AND MODE MANAGEMENT WITH POWERTRAIN AND BRAKE SUPPORT; U.S. Pat. No. 10,126,754, titled METHOD FOR SETTING TRAVEL PATH OF AUTONOMOUS VEHICLE; U.S. Pat. No. 9,896,130, titled GUIDANCE SYSTEM FOR A VEHICLE REVERSING A TRAILER; U.S. Pat. No. 9,821,845, titled TRAILER LENGTH ESTIMATION METHOD USING TRAILER YAW RATE SIGNAL; U.S. Pat. No. 9,656,691, titled METHOD FOR PERFORMING AN AT LEAST SEMI-AUTONOMOUS PARKING PROCESS IN A GARAGE; U.S. Pat. No. 9,541,409, titled MARKER AIDED AUTONOMOUS VEHICLE LOCALIZATION, and U.S. Pat. No. 9,540,043, titled TRAILER BACKUP ASSIST SYSTEM WITH ACTIVE TRAILER BRAKING FOR CURVATURE CONTROL, each of which is incorporated herein by reference in its entirety. Many of the maneuvering aids disclosed in the above-mentioned patents and published patent applications only provide limited or specialized maneuvering assistance and/or are complicated systems that do not lend themselves to broad applicability. Accordingly, a need exists for improved systems and methods of identifying, tracking, and guiding transport vehicles within a logistics yard.

BRIEF DESCRIPTION OF THE DRAWINGS

FIG. 2B is a block diagram of an identification/guidance unit configured in accordance with embodiments of the present technology.

DETAILED DESCRIPTION

Figure 1:
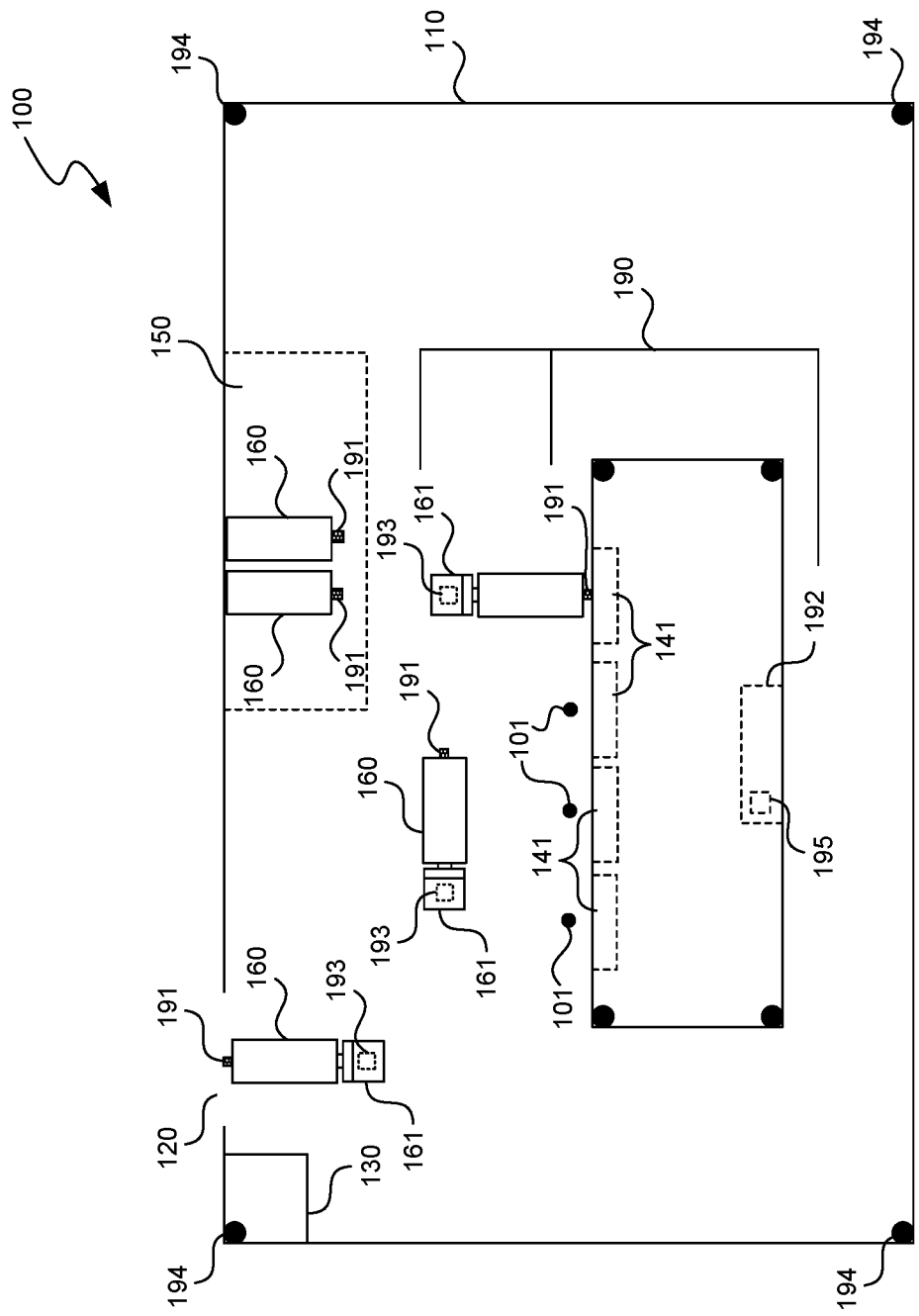
FIG. 1 is a top view schematic diagram illustrating a logistic yard equipped with an identification and guidance system configured in accordance with embodiments of the present technology.

Described herein are various embodiments of systems and methods for identifying and/or guiding transport vehicles within a logistics yard, and more specifically, to an identification/guidance (I/G) unit that can be attached to a transport vehicle and communicate with a remote controller and/or a portable communications device (e.g., smart phone, tablet, etc.) to facilitate management of the logistics yard. In some embodiments, the I/G unit can be attached to a transport vehicle upon the transport vehicle entering a logistics yard, at which point the I/G unit is linked in the system to the transport vehicle to which it is attached such that any subsequent transport vehicle information transmitted by the I/G unit is understood to be associated with that specific transport vehicle. As the transport vehicle moves or is moved through the logistics yard, transport vehicle information such as the location of the transport vehicle is transmitted by the I/G unit to a remote controller via a network. The transport vehicle information can then be relayed from the remote controller to a portable communications device, such as a smart phone or tablet, via the network. The I/G unit can include one or more cameras and/or sensors that can be used to assist a driver in maneuvering the transport vehicle through the logistics yard. For example, the I/G unit can transmit video taken by a camera on the I/G unit to the remote controller, which relays the video to a portable communications device for use by the driver to maneuver the transport vehicle on which the I/G unit is attached. The video can be particularly useful when backing the transport vehicle up to a dock station.

Certain details are set forth in the following description and FIGS. 1-7 to provide a thorough understanding of various embodiments of the disclosure. Those of ordinary skill in the relevant art will appreciate, however, that the technology disclosed herein can have additional embodiments that may be practiced without several of the details described below and/or with additional features not described below. In addition, some well-known structures and systems often associated with transport vehicles, logistics yards, loading docks, loading dock equipment, loading dock equipment control systems, apparatuses, and methods have not been shown or described in detail below to avoid unnecessarily obscuring the description of the various embodiments of this disclosure.

In the Figures, identical reference numbers identify identical, or at least generally similar, elements. Many of the details, dimensions, angles, and other features shown in the Figures are merely illustrative of particular embodiments of the disclosure. Accordingly, other embodiments can have other details, dimensions, angles, and features without departing from the spirit or scope of the present invention. In addition, those of ordinary skill in the art will appreciate that further embodiments of the invention can be practiced without several of the details described below.

FIG. 1 is a top view schematic diagram of a logistics yard 100 having an identification and guidance system 190 configured in accordance with embodiments of the present technology. The logistics yard 100 includes a perimeter barrier 110 enclosing the logistics yard 100, an entrance/exit gate 120, a guard shack 130, a warehouse 140 including multiple loading dock stations 141, and a parking area 150. Multiple transport vehicles 160 can be located inside the logistics yard 100 during operation, such as a transport vehicle 160 entering the logistics yard 100 at the entrance/exit gate 120, a transport vehicle 160 positioned at a loading dock station 141, and transport vehicles 160 parked in parking area 150. In the illustrated embodiment, the transport vehicles 160 can include conventional OTR trailers towed by conventional tractors, such as OTR tractors or yard tractors. The Identification and guidance system 190 includes an identification/guidance (I/G) unit 191 attached to each transport vehicle 160, a remote controller 192 (which may be located in the warehouse 140 as shown in FIG. 1, and which may include a display 195), and multiple portable communication devices 193. The identification and guidance system 190 may also optionally include one or more antennas 194 serving as part of the network used to transmit information between the I/G units 191, the remote controller 192 and the portable communication devices 193.

Any type of perimeter barrier 110 can be used for the logistics yard 100, such as a concrete wall or chain link fence. In some embodiments, the perimeter barrier 110 can fully enclose the logistics yard 100, and in other embodiments, the perimeter barrier 110 can only partially enclose the logistics yard 100. In some embodiments, the perimeter barrier 110 is optional and can be eliminated altogether. In the illustrated embodiment, the antennas 194 are located at the perimeter barrier 110 (e.g., at the corners of the perimeter barrier 110), although in other embodiments, other antenna locations within the logistic yard 100 are possible.

The entrance/exit gate 120 can be any type of gate or barrier suitable for controlling access into and out of the logistics yard 100. While FIG. 1 shows a single entrance/exit gate 120, multiple entrance/exit gates 120 can also be provided, including instances in which a first entrance/exit gate 120 is provided for only transport vehicles 160 entering the logistics yard 100, and a second entrance/exit gate 120 is provided for only transport vehicles 160 exiting the logistics yard 100.

The guard shack 130 can be any type of structure positioned proximate an entrance/exit gate 120 and used to control entry or exit of transport vehicles 160 into and out of the logistics yard 100. As described in further detail below, the guard shack 130 can also play a role in attaching and removing the I/G units 191 to the transport vehicles 160 entering and exiting the logistics yard 100, and/or in entering I/G unit 191 information into the remote controller 192 so that subsequent information transmitted by the I/G unit 191 can be associated with the corresponding transport vehicle 160.

The warehouse 140 can be any type of warehouse or other building, including a warehouse configured for distribution, manufacture and/or processing. The logistics yard 100 may also include multiple warehouses 140. The warehouse 140 can include any number of the loading dock stations 141, and the loading dock stations 141 can include any type of equipment typically used at loading docks (e.g., a dock door, a trailer restraint, a dock leveler, etc.). The loading dock stations 141 can further include automated loading dock equipment systems, such as those disclosed in U.S. Pat. No. 10,081,504, titled SYSTEMS AND METHODS FOR AUTOMATICALLY CONTROLLING LOADING DOCK EQUIPMENT; and U.S. patent application Ser. No. 15/145,605, titled CONTROL SYSTEMS FOR OPERATION OF LOADING DOCK EQUIPMENT, AND ASSOCIATED METHODS OF MANUFACTURE AND USE, both of which are incorporated herein by reference in their entirety.

The parking area 150 can have any size, shape and location within the logistics yard 100, and the logistics yard 100 can include any number of parking areas 150. As described previously, the transport vehicle 160 can be any type of transport vehicle, including trailers that are towed by OTR tractors or dedicated logistics yard tractors and integrated cargo vehicles. FIG. 1 generally shows transport vehicles 160 towed by OTR tractors 161. The transport vehicles 160 located in the parking area 150 are not attached to tractors.

In FIG. 1, an I/G unit 191 is attached to the rear surface of each transport vehicle 160 located within the logistics yard 100. For example, the I/G unit 191 is attached to the rear door of the transport vehicle 190. As described in greater detail below, the I/G unit 191 is configured to transmit transport vehicle information over a network to the remote controller 192 and/or to the portable communication device 193 located in corresponding tractor 161. The information can include various types of information relating to transport vehicle 160 which may be helpful in managing the logistics yard 100 and/or aiding the driver in maneuvering the transport vehicle 160 about the logistics yard 100. For example, the transport vehicle information can include vehicle location information and video and sensor information that can be transmitted to the driver (e.g., via the portable communications device 193) to use to maneuver the transport vehicle 160 around the logistics yard 100, and specifically when aligning the transport vehicle 160 at one of the loading dock stations 141 or when parking the transport vehicle 160 in one of the parking areas 150.

Figure 2A:
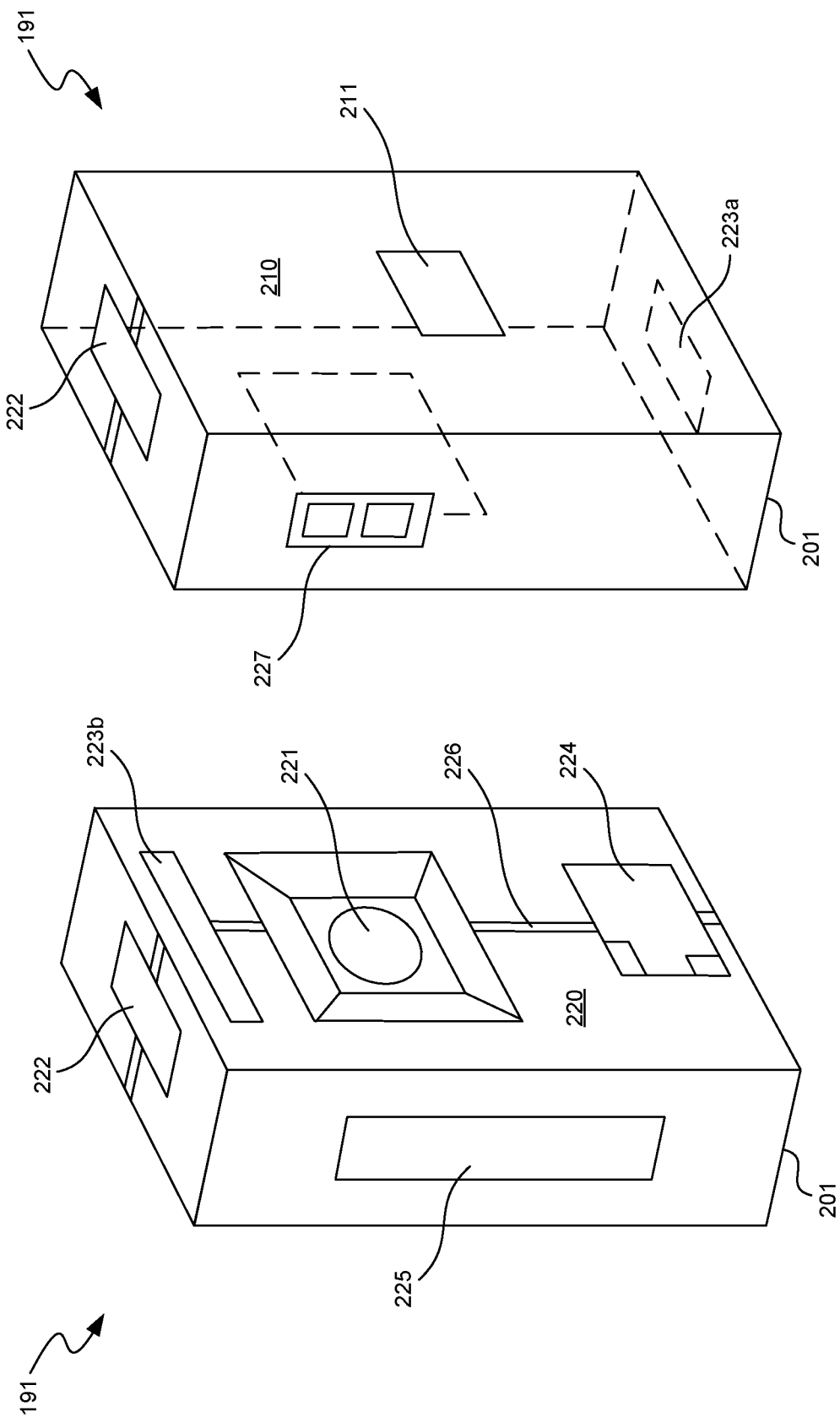
FIG. 2A is an isometric view of the front and back of an identification/guidance unit configured in accordance with embodiments of the present technology.

FIG. 2A is an isometric view of the front and back of the I/G unit 191 configured in accordance with embodiments of the present technology. In the illustrated embodiment, the I/G unit 191 has a generally rectangular-shaped housing 201, though other shapes, such as circular and oval, can also be used. The housing 201 is generally configured to house various components of the I/G unit 191, e.g., a transceiver, a processor, etc. The housing 201 includes a rear surface 210 and a front surface 220 opposite the rear surface 210. The rear surface 210 of the I/G unit 191 is generally flat so that it can be placed directly against a rear surface of the transport vehicle 160, such as the rear door of the transport vehicle 160. The rear surface 210 can include an attachment mechanism 211 to removably secure the I/G unit 191 to the rear surface of the transport vehicle 160. Any suitable attachment mechanism can be used, including, but not limited to, magnets, adhesives, hook and loop fasteners (e.g., Velcro), clips, straps, etc. The attachment mechanism 211 is preferably a non-permanent attachment mechanism such that the I/G unit 191 can be easily attached to the rear surface of the transport vehicle 160 when it enters the logistics yard 100 and easily removed from the rear surface of the transport vehicle 160 when the transport vehicle 160 leaves the logistics yard 100.

The front surface 220 of the I/G unit 191 located opposite the rear surface 210 faces outwardly from the rear surface of the transport vehicle 160 when attached thereto. Various data collection components of the I/G unit 191 can be located at or near the front surface 220, with each of the components being configured to gather transport vehicle information that is sent to the remote controller 192 and/or the portable communications device 193 via a network.

In some embodiments, a camera 221 is located on the front surface 220 of the I/G unit 191. The camera 221 can be configured to take video and/or still images of a field of view extending outward from the I/G unit 191. For example, when the I/G unit 191 is attached to the rear door of the transport vehicle 160, the camera 221 will take video and/or still images of an area proximate the transport vehicle (i.e., immediately behind the transport vehicle 160). The video and/or still images can be sent to the remote controller 192 and/or the portable communications device 193 via a wireless network so that the video and/or still images can be displayed on the remote controller 192 and/or the portable communications device 193. When the video and/or still images are displayed on the portable communications device 193, the driver of the transport vehicle 160 can view the video and/or still images displayed on the portable communications device 193 to assist with, e.g., positioning the transport vehicle 160 at a loading dock station 141. For example, the camera 221 can obtain video of the area behind and proximate the transport vehicle 190 as the driver is backing the transport vehicle 160 up to the loading dock station 141 or maneuvering the transport 160 trailer into the parking area 150, and the I/G unit 191 transmits this video feed in real time or near real time to the portable communications device 193 located in the cab of the tractor 161 maneuvering the transport vehicle 160. Using the video feed provided on the display of the portable communications device 193, the driver can view the area behind the transport vehicle 160 and use this information to align the transport vehicle 160 at the loading dock station 141 or into a parking space in the parking area 150. The video feed provided by the camera 221 can be either direct imaging or mirrored imaging (i.e., where the video feed displayed on the display of the portable communications device 193 is the mirror image of the actual view of the camera). Mirrored imaging can be beneficial for use with articulated transport vehicles. In the illustrated embodiment, the camera 221 is recessed into the front surface 220 of the I/G unit 191 in order to provide some measure of protection to the camera from, e.g., weather. Non-recessed configurations can also be used.

The I/G unit 191 can further include a positioning device 222 configured to receive location data relating to the location of the I/G unit 191 (and the transport vehicle 160 to which it is attached) and to determine the location of the I/G unit 191 based on the received location data. Any positioning device capable of receiving real time or near real time location data and determining the location of the I/G unit 191 based on the received location data can be used. In some embodiments, the positioning device 222 includes a receiver that is configured to receive location data from an external positioning source. The external positioning source transmitting location data can be satellites (such as when the Global Positioning System (GPS) is used), cellular towers, WiFi networks, beacons (such as Bluetooth beacons), terrestrial transmitters, etc. Depending on the external source, the positioning device 222 may further include a processor configured to process raw location data into specific location information. For example, the positioning device 222 may be able to perform triangulation calculations based on the raw location data received from the external source to thereby compute the specific location of the I/G unit 191. Once the specific location of the I/G unit 191 has been received and/or computed by the positioning device 222, it can be transmitted by the I/G unit 191 to, e.g., the remote controller 192. While shown on a top surface of the I/G unit 191 in FIG. 2A, the positioning device 222 can be located anywhere on or within the I/G unit 191.

The I/G unit 191 can also include one or more sensors 223 configured to provide transport vehicle guidance information, such as information relating to the proximity of the transport vehicle 160 to surrounding objects (e.g., the loading dock station 141). The sensors 223 can be any type of sensors, including infrared sensors, laser sensors, microwave sensors, inductive loop sensors, photo sensors, pressure sensors, ultrasonic sensors, sonar sensors, thermal sensors, optical sensors, magnetic sensors, or camera analytics sensors, and multiple types of sensors can be used on the I/G package 191.

In some embodiments, the sensors 223 can be located on one or more surfaces of the I/G unit 191 in order to provide multi-faceted guidance information. For example, a downward looking sensor 223a can be used to sense objects on or toward the ground as the transport vehicle 160 backs up to the loading dock station 141, such as a trailer restraint positioned on the ground in front of the loading dock station 141. When the trailer restraint is identified by the downward looking sensor 223a, a signal can be sent to the driver (via the portable communications device 193) to let the driver know the transport vehicle 160 is aligned with the trailer restraint. Similarly, a front facing sensor 223b can be used to send signals to the driver (via the portable communications device 193) letting the driver know how close or far away from the loading dock station 141 the transport vehicle 160 is as it is backing up to the loading dock station 141. In some embodiments, a proximity sensor configured to emit an electromagnetic field or a beam of electromagnetic radiation can be used for detecting an object (such as in the case of the downward looking sensor 223a sensing for a trailer restraint described above) and/or for determining distance (such as in the case of the front facing sensor 223b determining the distance to the loading dock station 141 described above). In the case of detecting an object, the proximity sensor detects a change in the emitted electromagnetic field or beam of electromagnetic radiation to identify an object. In the case of determining distance, the proximity sensor measures the time it takes for the beam of electromagnetic radiation to bounce off an object and return to the sensor and calculates distance based on the speed at which the beam travels.

In some embodiments, the one or more sensors 223 are configured to detect positional locating devices 101 embedded or otherwise positioned on or in the logistics yard 100. For example, the logistics yard 100 can include a plurality of locating devices 101, such as magnetic, electrical, electro-optical, RFID transponder, wireless transmitter, or similar devices that are embedded in, or otherwise attached to or near, the surface of the logistics yard 100. In such embodiments, the sensor 223 can be configured to detect the presence of a locating device 101, receive identification information relating to the locating device 101, and/or receive physical location information from the locating device 101. In some embodiments, each locating device 101 is associated with a location in the logistics yard 100 such that when the sensor 223 detects the locating device 101, the physical location information associated with the sensed locating device 101 is transmitted to the sensor 223 (or processor of the I/G unit 191). Alternatively, the sensor 223 (in association with the processor, transceiver, etc. of the I/G unit 191) can detect a specific locating device 101, receive locating device identification information from the locating device 101, and transmit this identification information to the remote controller 192, which then accesses a database including physical location information for each identified locating device 101. In some embodiments, the sensor 223 can include a magnetic field sensor, such as an FLC 100 magnetic field sensor from Stefan Mayer Instruments, Wallstr. 7, D-46535 Dinslaken, Germany. Additional disclosure of a system of sensors and locating devices suitable for use in the embodiments described herein is set forth in U.S. patent application Ser. No. 16/109,603, titled VEHICLE GUIDANCE SYSTEMS AND ASSOCIATED METHODS OF USE AT LOGISTICS YARDS AND OTHER LOCATIONS, which is hereby incorporated by reference in its entirety.

In some embodiments, the locating devices 101 can be used to establish paths along which the transport vehicle 160 can travel, such as a path for backing the transport vehicle 160 up to one of the loading dock stations 141 or parking the transport vehicle 160 in the parking area 150. Such a path can include a locating device 101 located at a starting position. The sensor 223 is used to detect the starting position locating device 101 and subsequent locating devices 101 along the path. In some embodiments, a path of locating devices 101 can be provided for each loading dock station 141. These paths are one embodiment of the track or rail guidance system described in U.S. patent application Ser. No. 16/109,603, titled VEHICLE GUIDANCE SYSTEMS AND ASSOCIATED METHODS OF USE AT LOGISTICS YARDS AND OTHER LOCATIONS, which is hereby incorporated by reference in its entirety.

The I/G unit 191 can also include a unique identifier 224 configured for use in identifying the I/G unit 191 and the transport vehicle 160 to which it is attached. The unique identifier 224 can include any type of unique identifier, including both identifier devices and identifying indicia. Specific, though non-limiting, examples include a QR code, a bar code, or an alphanumeric code. The unique identifier 224 can be used when initially pairing the I/G unit 191 with the transport vehicle 160. For example, with reference to FIG. 1, when the transport vehicle 160 enters the logistics yard 100 via the entrance/exit gate 120, the I/G unit 191 may be attached to the rear end of the transport vehicle 160. In some embodiments, an attendant at the guard shack 130 attaches the I/G unit 191 to the rear end of the transport vehicle 160. As part of attaching the I/G unit 191 to the transport vehicle 160, the attendant can scan or otherwise enter the identifier 224 into the remote controller 192. In some embodiments, the unique identifier 224 is input into the remote controller 192 via a remote device communicatively connected with the remote controller 192. The remote device can be a handheld device, a personal computer, or any other type of remote terminal that is configured to receive the unique identifier 224 and transmit the unique identifier 224 to the remote controller 192. The remote device can be stored and/or housed in the guard shack 130. The attendant then scans or enters into the remote controller 192 information identifying the transport vehicle 160 to which the I/G unit 191 has been attached to thereby link, pair, or otherwise associate the identified I/G unit 191 with the identified transport vehicle 160. The same remote device used to input the unique identifier 224 into the remote controller 192 can also be used to input transport vehicle identification information into the remote controller 192. With the I/G unit 191 being paired to the transport trailer 160, any future information conveyed by the I/G unit 191 to the remote controller 192 is associated with the transport vehicle 160 to which the I/G unit 191 was attached. This pairing information received by the remote controller 192 is used the entire time the I/G unit 191 is attached to the transport vehicle 160. When further used in conjunction with, for example, an ERP system that provides information on the contents of an identified transport vehicle 160, the unique identifier 224 and the I/G unit 191 can also be used to identify contents of the transport vehicle 160. For example, if the transport vehicle 160 is parked in the parking area 150, the unique identifier 224 can be scanned to identify the I/G unit 191, and once identified, the ERP system can be accessed to determine the contents of the transport vehicle 160 to which the identified I/G unit 191 is attached, all without having to open the transport vehicle 160.

The I/G unit 191 further includes an antenna 225 configured to transmit data from the I/G unit 191 to the remote controller 192 and/or a portable communications device 193. In the illustrated embodiment, the antenna 225 is located on a side surface of the I/G unit 191, although in other embodiments, the antenna 225 may be located on any suitable surface of the I/G unit 191. Any type of antenna suitable for transmitting data can be used for antenna 225. In some embodiments, the antenna 225 can be selected based on the type of network used with the system 190. For example, when a LAN is used to transmit data within the system 190, the antenna 225 can be a LAN-configured antenna. The antenna 225 cooperates with the transceiver 204 (FIG. 2B) to transmit transport vehicle information over the network.

Other features of the I/G unit 191 can include a housing 201 that is hardened so that the I/G unit 191 can withstand inclement weather, electromagnetic interference (EMI) and/or other harsh conditions and handling. The housing 201 can also have a color that provides a high contrast with the color of the transport vehicle 160 so that it is easy to visually identify the I/G unit 191 on the exterior of the transport vehicle 160. The I/G unit 191 can also include a visible centerline guide 226 that can be used to assist with proper positioning of the I/G unit 191 on the rear end of the transport vehicle 160. For example, in order for real time video sent from the I/G unit 191 to the portable communications device 193 to be helpful in assisting a driver align the transport vehicle 160 with the loading dock station 141, it may be necessary for the camera 221 to be positioned at the centerline of the rear end of the transport vehicle 160. The centerline guide 226 can include, e.g., a transparent window extending from the front surface 220 to the rear surface 210 of the I/G unit 191. A centerline marking may be provided on the rear end of the transport vehicle 160 so that the I/G unit 191 can be aligned by viewing the centerline guide 226. The I/G unit 191 can also include a manual switch 227 that allows a user to manually turn the I/G unit 191 on and off. In some embodiments, the manual switch 227 also allows a user to manually switch the I/G unit 191 between power modes (described in further detail below).

As described previously, the I/G unit 191 is configured to transmit both identification and guidance information. However, it should be appreciated that in some embodiments, the I/G unit 191 is configured to transmit only identification information or only guidance information.

FIG. 2B is a block diagram of the I/G unit 191 configured in accordance with embodiments of the present technology. The I/G unit 191 can include a processor 201, a program memory 202, a storage memory 203, a transceiver 204, and a battery 205, as well as the camera 221 and the sensors 223a, 223b discussed previously. The processor 201 is configured to process logic and execute routines, algorithms and/or other computer-executable instructions described herein, which can be stored in the program memory 202 and/or other computer-readable media. The processor 201 can include any logic processing unit, such as one or more microprocessors, central processing units (CPUs), digital signal processors (DSPs), application-specific integrated circuits (ASICs), etc. The processor 201 may be a single processing unit or multiple processing units in a single device or distributed across multiple devices. The processor 201 can be operably connected to various components of the I/G unit, including, for example, the transceiver 204, the camera 221, the positioning device 222, and the sensors 223a, 223b. The transceiver 204 is configured to transmit data from the I/G unit 191 to the remote controller 192 and/or the portable communications device 193 via a wireless network. The transceiver 204 (e.g., including a Wi-Fi access point, a Bluetooth transceiver, a near-field communication (NFC) device, and/or a wireless modem or cellular radio utilizing GSM, CDMA, 3G, and/or 4G technologies, each of which may include an associated antenna or antennas) is suitable for wireless communication with other components of the system 190. In some embodiments, the transceiver coordinates with the positioning device 222 (FIG. 2A) to receive location data from an external positioning source as discussed previously. The wireless network can include a local area network (LAN), a wide area network (WAN), a WiFi network, a cellular network, a mesh network (e.g., Bluetooth network), the Cloud, an Internet of Things (IoT) network, or any other type of network configured for wireless transmission of data between components of the identification and guidance system 190. Together, the processor 201, the program memory 202, the storage memory 203 and the transceiver 204 can implement the identification and guidance system processes described herein, such as the processes described below with reference to FIG. 6 and FIG. 7.

In some embodiments, the I/G unit 191 is powered by the battery 205. Any suitable type of battery may be used to power the I/G unit 191, including a rechargeable battery such as a lithium ion rechargeable battery. In embodiments using a rechargeable battery 205, the I/G units 191 can be recharged at the guard shack 130 (FIG. 1), such as by a multiport recharging station capable of housing and recharging multiple of the I/G units 191 at once. A benefit of recharging the I/G units 191 at the guard shack is that this helps to ensure that the I/G unit 191 has been charging or is fully recharged immediately prior to being attached to the transport vehicle 160 as it enters the logistics yard 100, and that the I/G unit 191 can be recharged immediately after it is removed from the transport vehicle 160 as it leaves the logistics yard 100.

In order to manage battery power in the I/G unit 191 and generally extend the life of the I/G unit 191 during use, the I/G unit 191 can be configured to operate in two or more power modes. In some embodiments, the I/G unit operates in at least a low power mode and a high power mode. In low power mode, the battery 205 provides a relatively low amount of power, so that only a limited number of functions, or no functions, can be carried out by the I/G unit 191. In full power mode, enough power is provided to the I/G unit 191 so that it is mostly or fully functional. Examples of when the I/G unit 191 may be put in low power mode include when the I/G unit 191 is not in use (i.e., not attached to a transport vehicle 160) and when the transport vehicle 160 to which the I/G unit 191 is attached is parked in a parking area 150. In some embodiments, the functionality of the I/G unit 191 when in low power mode is limited to positioning/location functionality. In other words, guidance functionality (e.g., camera and sensors) may not be operational when the I/G unit 191 is in low power mode. As such, the transport vehicle 160 to which the low power mode I/G unit 191 is attached can still be located within the logistic yard 100. In other embodiments, the functionality of the I/G unit 191 when in low power mode is limited to receiving and processing instructions to enter high power mode. In other words, the I/G unit does not even provide positioning/location functionality in low power mode.

Implementation of the battery power management described previously is generally carried out by the processor 201 and/or the remote controller 192. The processor 201 can execute software that changes the power mode to, for example, a low power mode or a high power mode. Instructions to execute this software may come from, for example, the remote controller 192. In some embodiments, instructions from the remote controller 192 to enter a low power mode or a high power mode are initiated by an operator at the remote controller 192. For example, the display 195 of the remote controller 192 can display a user interface that allows an operator to monitor various aspects of the system 190, including the power mode of each I/G unit 191 being used in the logistics yard 100. The user interface can include the ability to change the power mode of any I/G unit 191. When an operator changes the power mode of an I/G unit 191 via the user interface, the remote controller 192 transmit instructions to the I/G unit 191. When received by the I/G unit 191, the instructions cause the processor to execute the software in accordance with the instructions sent (i.e. move into low power mode or move into high power mode). In an example, the user interface of the remote controller 192 indicates that an I/G unit 191 has been attached to a transport vehicle 160 entering the logistics yard 100, at which point the operator sends instructions to the I/G unit 191, via the remote controller 192, to enter a high power mode. The user interface can display movement of the transport vehicle 160 through the logistics yard 100, and when the operator sees that the transport vehicle 160 has parked in the parking area 150 or at the loading dock station 141, the operator can send another instruction to the I/G unit 191, via the remote controller 192, to enter a low power mode. In embodiments where low power mode does not include positioning/location functionality, the operator can send instructions to the I/G unit 191, via the remote controller 192, to enter high power mode so that positioning/location functionality is activated, and the location of the transport vehicle 160 can be verified.

In some embodiments, the location of the I/G unit 191 within the logistics yard 100 controls the power mode of the I/G unit 191. For example, when the I/G unit 191 sends transport vehicle location information to the remote controller 192 indicating that the transport vehicle 160 to which the I/G unit 191 is attached is located in the parking area 150, the remote controller 192 transmits instructions to the I/G unit 191 that, when executed by the processor 201, puts the I/G unit 191 in low power mode. Similarly, when the I/G unit 191 transmits transport vehicle location information indicating that the transport vehicle 160 to which the I/G unit 191 is attached is near a loading dock station 141, the remote controller 192 sends instructions to the I/G unit 191 that, when executed by the processor 201, puts the I/G unit 191 in full power mode so that guidance functionality (e.g., camera and/or sensors) becomes operational.

Other manners of controlling the power mode of the I/G unit 191 include use of an accelerometer, motion detector, or related device built in to the I/G unit 191 to detect when the transport vehicle 160 is moving. If the accelerometer or other motion detecting device determines that the I/G unit 191 is in motion, then the processor 201 executes the software such that the I/G unit 191 enters the high power mode. Alternatively, if the accelerometer or other motion detecting device does not detect movement for a prescribed period of time (e.g., 5 minutes), the processor 201 executes the software such that the I/G unit 191 enter the low power mode. The I/G unit 191 can also include a manual switch 227 that provides the ability to change the power mode of the I/G unit 191 directly at the I/G unit 191. Yard workers can use the manual switch 227 to briefly change the power mode of the I/G unit from low power mode to high power mode so that, for example, the I/G unit can send updated location information to the remote controller 192.

Figure 3:
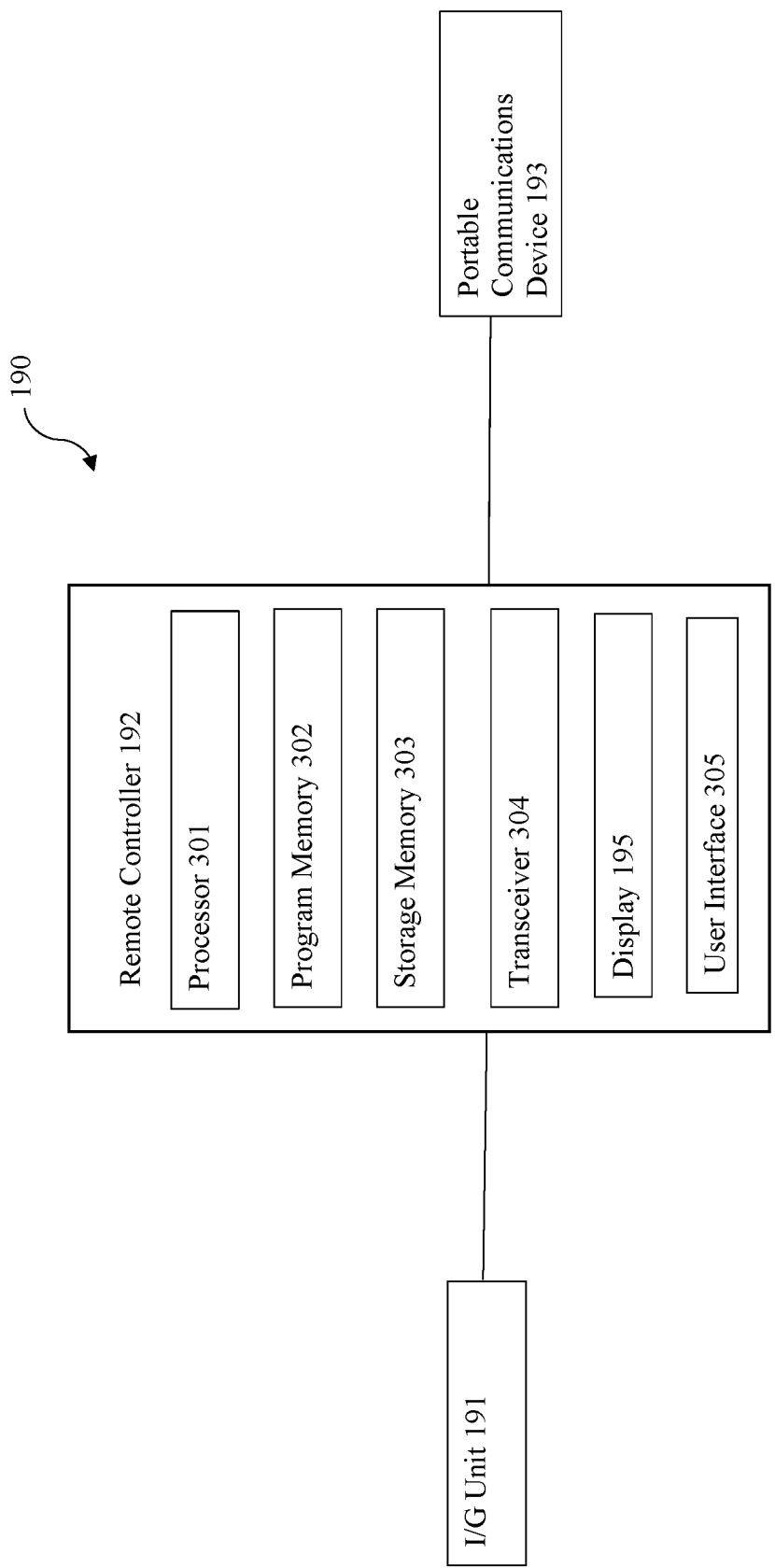
FIG. 3 is a block diagram of a remote controller configured in accordance with embodiments of the present technology.

FIG. 3 is a block diagram of the remote controller 192 configured in accordance with embodiments of the present technology. As those of ordinary skill in the art will appreciate, in some embodiments, the remote controller 192 can also be referred to as a processing center, a central computer or simply a computer, a central processing device or a processing device, and the like without departing from the present disclosure. The remote controller 192 can include a processor 301, a program memory 302, a storage memory 303, and a transceiver 304. The processor 301 is configured to process logic and execute routines, algorithms and/or other computer-executable instructions described herein, which can be stored in the program memory 302 and/or other computer-readable media. The processor 301 can include any logic processing unit, such as one or more microprocessors, central processing units (CPUs), digital signal processors (DSPs), application-specific integrated circuits (ASICs), etc. The processor 301 may be a single processing unit or multiple processing units in a single device or distributed across multiple devices. The processor 301 can be operably connected to other components of the remote controller 192, including, for example, the transceiver 304. The transceiver 304 is configured to receive data from the I/G unit 191 and/or the portable communications device 193 and to transmit data to the I/G unit 191 and/or the portable communications device 193 via the wireless network described previously. The transceiver 304 (e.g., including a Wi-Fi access point, a Bluetooth transceiver, a near-field communication (NFC) device, and/or a wireless modem or cellular radio utilizing GSM, CDMA, 3G, and/or 4G technologies, each of which may include an associated antenna or antennas) is suitable for wireless communication with other components of the system 190. Together, the processor 301, the program memory 302, the storage memory 303 and the transceiver 304 can implement the identification and guidance system processes described herein, such as the processes described below with reference to FIG. 6.

The remote controller 192 may be any type of computer system configured to receive, process and/or transmit transport vehicle information. In some embodiments, the remote controller 192 is a desktop computer, a CPU with one or more sensors, or the like. A primary role of the remote controller 192 is to receive transport vehicle information from one or more of the I/G units 191 via a network of the system 190 and to transmit transport vehicle information to one or more of the portable communication devices 193 via the network. In the process of receiving and transmitting transport vehicle information, the remote controller 192 can also store transport vehicle information in an associated database, display transport vehicle information (such as on the display 195), process transport vehicle information, and/or transmit instructions for execution by the portable communications device 193 and/or the I/G unit 191 based on how the transport vehicle information has been processed by the remote controller 192. For example, and as described previously, the remote controller 192 can receive transport vehicle location information from the I/G unit 191, process the transport vehicle location information, and, based on how the transport vehicle location information is processed by the remote controller 192, transmit instructions to the I/G unit 191 to toggle between different power modes.

In some embodiments, the remote controller 192 is configured to receive transport vehicle information from multiple I/G units 191 and transmit transport vehicle information (e.g., video and/or still image data, etc.) to multiple portable communication devices 193 in a manner that promotes efficient management of the logistics yard 100. As such, the remote controller 192 is configured to keep track of which of the portable communications devices 193 is associated with which of the I/G units 191 and convey information (e.g., video and/or still image data) to the portable communication devices 193 in accordance with these associations. For example, the remote controller 192 receives and utilizes information linking a specific I/G unit 191 to a specific transport vehicle 160 to which it is attached, such that video and/or still image data transmitted by the I/G unit 191 to the remote controller 192 is processed by the remote controller 192 in a way that recognizes that video and/or still image data as relating to the specific transport vehicle 160. The remote controller 192 is then configured to transmit the video and/or still image data to the specific portable communication device 193 associated with the same transport vehicle 160 (i.e., to the portable communication 193 device being used by the driver responsible for maneuvering the transport vehicle 160 about the logistics yard 100). The remote controller 192 can also be configured to communicate with or incorporate an ERP system to further link together information pertaining to the specific transport vehicles 160 within logistics yard 100.

In some embodiments, the remote controller 192 includes a display 195 on which various information transmitted by the I/G unit 191 can be displayed. The display may include a user interface 305 that allows a user to access information transmitted to the remote controller 192 and, in some embodiments, send instructions to the I/G unit 191 and/or the portable communications device 193. In one example, the user interface includes a map of the logistics yard 100 shown on the display 195, including the location of all of the transport vehicles 160 in the logistics yard 100 (with location information obtained from the I/G units 191 associated with each of the transport vehicles 160). The map may be updated in real time or near real time such that movement of the transport vehicles 160 about the logistics yard 100 is shown on the map. The map may be interactive such that moving a cursor, clicking or tapping (in embodiments where display 195 is a touch screen) on a specific transport vehicle 160 brings up additional information regarding the transport vehicle 160. The type of information that can be accessed by clicking or tapping on a transport vehicle 160 can include, for example, the contents of the transport vehicle 160, the loading dock station 141 at which the transport vehicle 160 is to be loaded or unloaded (obtained, e.g., via integration of the system 190 with an ERP system), the time of entry of the transport vehicle 160 into the logistics yard, the driver assigned to the transport vehicle 160, and the time elapsed since the last movement of the transport vehicle 160. This information may be displayed in a window overlaid on the map or in a separate window. Clicking or tapping on the transport vehicle 160 may also access the type of information that is relayed to the portable communications device 193, such as the video feed from the camera 221 of the I/G unit 191, and sensor information from the sensors 223 on the I/G unit 191. This may allow for remote supervision of a transport vehicle as it moves around the logistics yard, such as may be desirable when a trainee or new employee is maneuvering the transport vehicle 160.

As described above, the remote controller 192 can be located within the warehouse 140. By locating the remote controller 192 within the warehouse 140, a warehouse manager or the like may be able to use the remote controller 192 to better manage operations within the warehouse 140 and in the logistics yard 100 in general. However, the remote controller 192 need not be located in the warehouse 140, and in other embodiments, the remote controller 192 can be located anywhere in the logistics yard 100, or at a location remote form the logistics yard 100.

Figure 4:
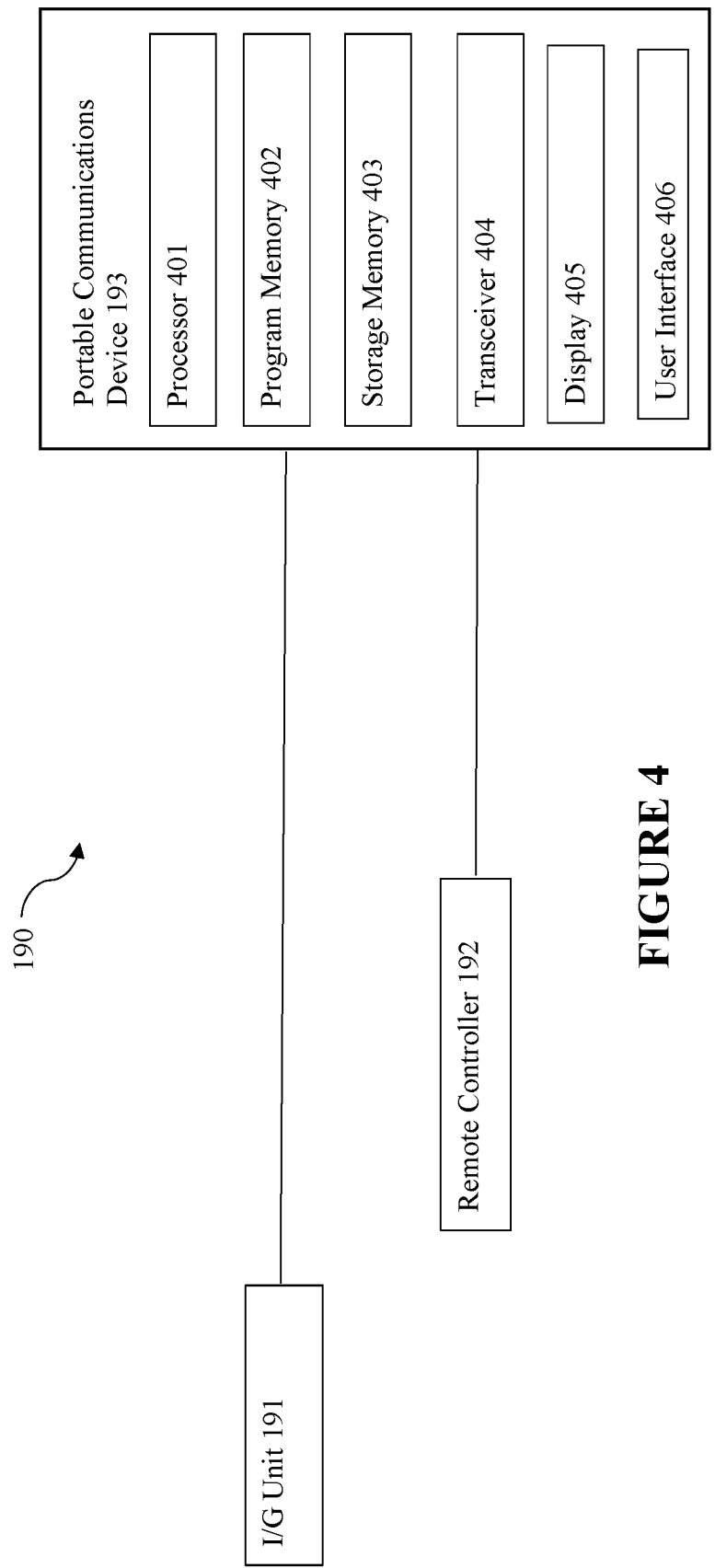
FIG. 4 is a block diagram of a portable communications device configured in accordance with embodiments of the present technology.

FIG. 4 is a block diagram of the portable communications device 193 configured in accordance with embodiments of the present technology. The portable communications device 193 can include a processor 401, a program memory 402, a storage memory 403, and a transceiver 404. The processor 401 is configured to process logic and execute routines, algorithms and/or other computer-executable instructions described herein, which can be stored in the program memory 402 and/or other computer-readable media. The processor 401 can include any logic processing unit, such as one or more microprocessors, central processing units (CPUs), digital signal processors (DSPs), application-specific integrated circuits (ASICs), etc. The processor 201 may be a single processing unit or multiple processing units in a single device or distributed across multiple devices. The transceiver 404 is configured to receive data, information, signals, etc., from the I/G unit 191 and/or the remote controller 192, and to transmit data, information, signals, etc., to the I/G unit 191 and/or the remote controller 192 via the wireless network described previously. The transceiver 404 (e.g., including a Wi-Fi access point, a Bluetooth transceiver, a near-field communication (NFC) device, and/or a wireless modem or cellular radio utilizing GSM, CDMA, 3G, and/or 4G technologies, each of which may include an associated antenna or antennas) is suitable for wireless communication with other components of the system 190. Together, the processor 401, the program memory 402, the storage memory 403 and the transceiver 404 can implement the identification and guidance system processes described herein, such as processes described below with reference to FIG. 6. The portable communications device 193 can be any type of device configured to wirelessly receive data, information, signals, etc. transmitted by the remote controller 192 and/or the IG unit 191 and display at least some of the data, information, signals, etc., transmitted by the remote controller 192 and/or the IG unit 191. For example, in some embodiments, the portable communications device 193 can be a laptop computer, a smart phone, tablet, FDA, etc.

In some embodiments, the portable communications device 193 includes a display screen 405 configured to display video and/or still images transmitted by the camera 221 of the I/G unit 191. The portable communications device 193 can also include a user interface that allows a user to access information transmitted to the portable communications device 193. In some embodiments, the portable communications device 193 is preferably a device that can be located in the cab of the tractor 161 so that the driver can view the information displayed on the screen 405 of the portable communications device 193 while maneuvering the transport vehicle 160. For example, when real time video is taken by the camera 221 of the field of view behind the transport vehicle 160, the real time video can be transmitted to the remote controller 192, relayed to the portable communications device 193, and then displayed on the screen 405 of the portable communications device 193. The driver can then view and use the real time video while backing up and aligning the transport vehicle 160 at the loading dock station 141. In some embodiments, the portable communications device 193 can include a dedicated screen 405 in the cab of the tractor 161 such that other devices such as laptops, smart phones and tablets do not need to be used or available in order to receive the transport vehicle information transmitted by the remote controller 192.

The system 190 described herein generally uses a wireless network in order to transmit data between components of the system 190 (i.e., the I/G unit 191, the remote controller 192, and the portable communications device 193). The components of the system 190 are each provided with the necessary hardware, software, electronics, sensors, etc., for communicating with the other components of the system 190 via a wireless network, such as conventional wireless networks known in the art. The specific type of network used for the system 190 is generally not limited, provided the network is capable of wirelessly transmitting data between the I/G unit 191, the remote controller 192, and the portable communications device 193. In some embodiments, the network is a local area network (LAN), a wide area network (WAN), a WiFi network, a cellular network, a mesh network, the Cloud, and IoT network, or any other type of network configured for wireless transmission of data between components of the identification and guidance system 190. The antennas 194 can be provided throughout the logistics yard 100 to facilitate transmission of data via the network between the components of the system 190. The antennas 194 may be configured for the specific type of network being used.

In some embodiments, a LAN is the preferred network type such that transmitted data is maintained locally and the overall system is simplified. The LAN provides a computer network that spans a relatively small area and therefore may require less infrastructure. In some embodiments in which the logistics yard 100 includes multiple warehouses 140, a LAN may be provided for each warehouse 140 (FIG. 1). In some embodiments, multiple LANs within the logistics yard 100 can be connected.

In an IOT environment, the components of the system 190 may all be connected to the Internet so that each component of the system 190 is capable of communicating with other components of the system 190. Cloud computing may also be used to network the components of the system 190. The system 190 can be configured such that all components of the system 190 communicate over the network through the remote controller 192. The network can also be configured so that all components of the system 190 are directly connected with the network, thereby permitting direct communication between any components of the system 190. In a mesh network, the mesh network is used to network together individual components of the system, e.g., multiple of the I/G units 191.

When the network of the system 190 is a Bluetooth mesh network, the mesh network provides a dynamic and non-hierarchical infrastructure where each node in the network (e.g., each of the I/G units 191) is directly connected to as many other nodes in the network as possible. A mesh network thereby provides for efficient routing of information within the network.

When a cellular network is used with the system 190, the network can include a cellular gateway to provide reliable and flexible Internet access to all components of the system 190. For example, a cellular gateway can facilitate communication between a mesh network of the I/G units 191, Use of a cellular gateway as a component of the network can eliminate the need for the components of the system 190 to access a LAN or WAN set up at the warehouse but used for other purposes.

Figure 5:
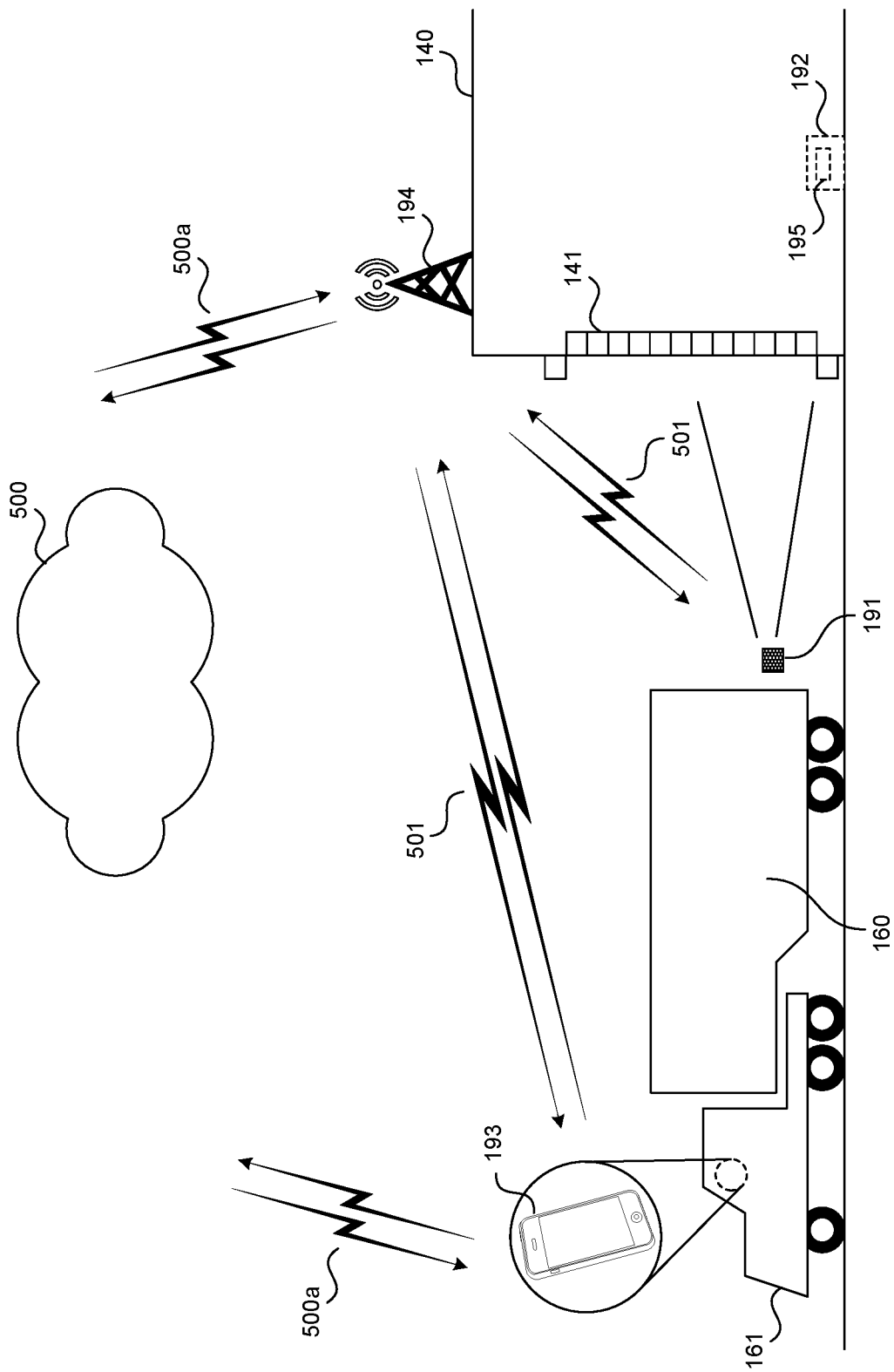
FIG. 5 is a side view partially schematic diagram illustrating an identification and guidance system configured in accordance with embodiments of the present technology.

FIG. 5 is a partially schematic diagram of the identification and guidance system 190 illustrating how information is transmitted and received between the components of the system 190 via a LAN 501 in accordance with embodiments of the present technology. The I/G unit 191 attached to the rear end of the transport vehicle 160 is configured to wirelessly transmit information over the LAN 501. For example, in some embodiments, the I/G unit 191 transmits transport vehicle information (e.g., location or guidance data) to the remote controller 192 via a wireless LAN 501. A LAN-configured antenna 194 is provided on the warehouse 140 where the remote controller 192 is located for receiving the wirelessly transmitted data and passing the data to the remote controller 192. The antenna 194 can then be used to transmit data from the remote controller 192 to the portable communications device 193 via the LAN 501. The portable communications device 193 is located within the cab of the tractor 161 maneuvering the transport vehicle 160 to the loading dock station 141 so that the driver can reference the guidance information provided on the display of the portable communications device 193 while backing up to the loading dock station 141. The LAN 501 provides for two-way communication between each of the components of the system 190.

The identification and guidance system 190 can also include a non-local network 500 in place of or as a supplement to the LAN 501. The non-local network 500 can include, for example, the Internet, the Cloud, a WAN, or a cellular network. Transmissions 500a carry information from components of the identification and guidance system 190 to the non-local network 500 and back. In some embodiments, the transmissions 500a pass directly from components of the identification and guidance system 190 (e.g., the I/G unit 191, the remote controller 192, and the portable communications device 193) and back, while in some embodiments the information is first passed to antennas 194 and then to network 500.

Figure 6:
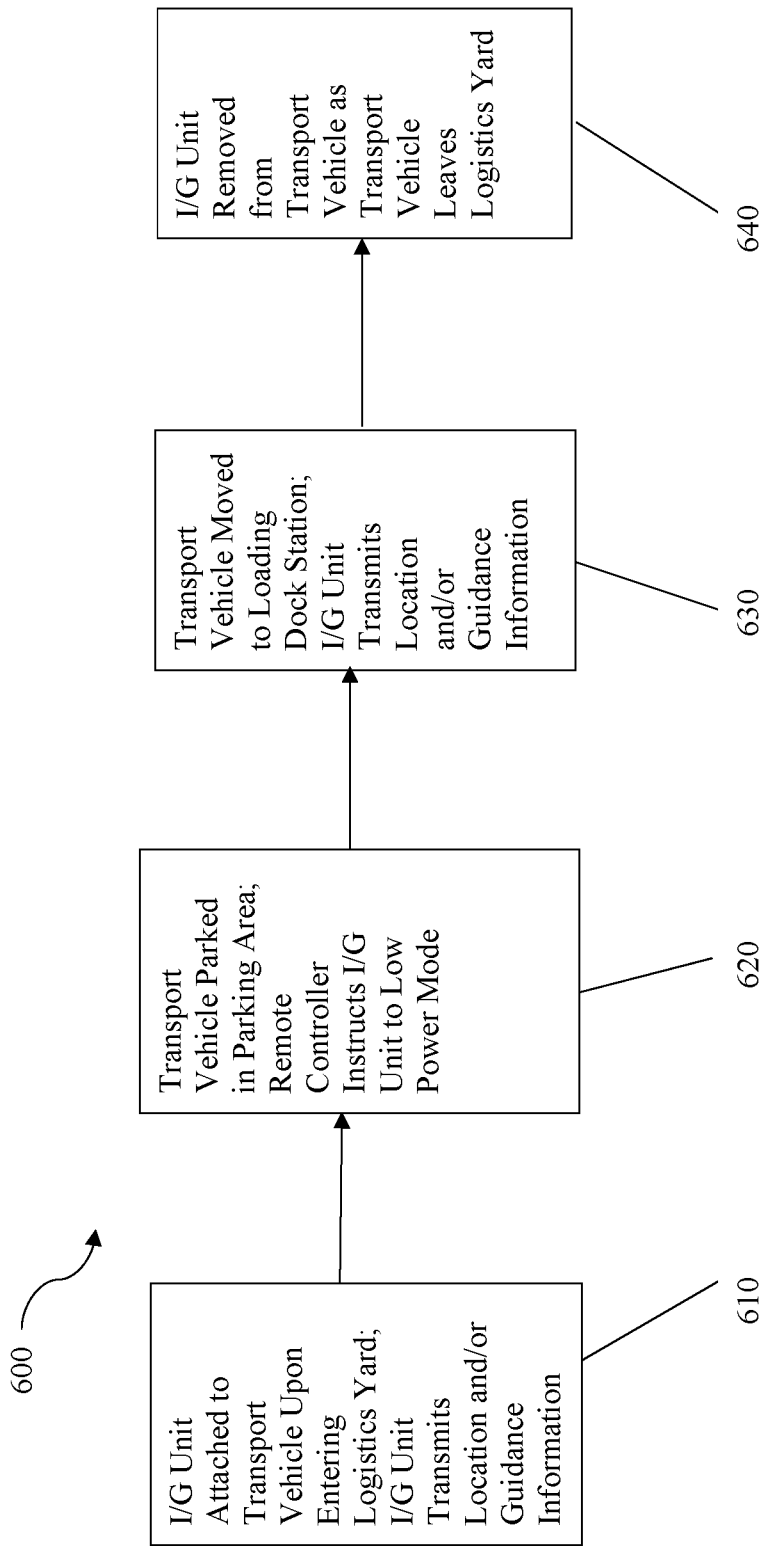
FIG. 6 is a flow chart illustrating an identification and guidance method configured in accordance with embodiments of the present technology.

FIG. 6 is a diagram illustrating a method 600 of using the I/G unit 191 in accordance with embodiments of the present technology. The method 600 can be carried out using the identification and guidance system 190 as described above, including the remote controller 192, and one or more of the portable communication devices 193.

In block 610, the transport vehicle 160 enters the logistics yard 100 and the I/G unit 191 is attached to the rear end of the transport vehicle 160 as described above. As part of attaching the I/G unit 191 to the transport vehicle 160, the unique identifier 224 of the I/G unit 191 and the identity of the transport vehicle 160 input into the remote controller 192 and linked together (as described above) such that any subsequent information transmitted by the I/G unit 191 is linked to the transport vehicle 160 to which the I/G unit 191 is attached. In some embodiments, the I/G unit 191 is attached to the rear end of the transport vehicle 160 at the centerline of the transport vehicle 160. Any suitable manner of attaching the I/G unit 191 to the transport vehicle 160 can be used, such as via an adhesive, Velcro, magnets, clips, straps or the like.

Once the I/G unit 191 is attached to the transport vehicle 160 in block 610 and the unique identifier 224 and the identity of the transport vehicle 160 are entered into the remote controller 192 and associated, the remote controller 192 instructs the I/G unit 191 to enter full power mode so that the I/G unit 191 is fully functional and all components of the I/G unit 191 are operational. Once the I/G unit 191 is in full power mode, the I/G unit 191 begins to transmit a variety of transport vehicle information, including location information and guidance information.

In block 620, the transport vehicle 160 is parked and temporarily stored in the parking area 150 of the logistics yard 100. The transport vehicle 160 can be parked and stored in the parking area 150 if, e.g., the loading dock station 141 where the transport vehicle 160 is to be loaded or unloaded is not available when the transport vehicle 160 enters the logistics yard 100 (e.g., another transport vehicle is occupying the assigned loading dock station). While parked, the I/G 191 transmits location data to the remote controller 192 via the network providing the location of the transport vehicle 160 within the logistics yard 100. The location information is received by the remote controller 192, which then relays the location information to the portable communications device 193. In some embodiments, the location information is transmitted to the portable communications device 193 of the driver who will ultimately be responsible for moving the transport vehicle 160 to the assigned loading dock station 141 once the loading dock station 141 becomes available. In this way, the driver can easily locate the transport vehicle 160 when necessary, even if the transport vehicle 160 is parked amongst several other transport vehicles 160 that may look similar or identical to the assigned transport vehicle 160.

When the transport vehicle 160 is parked at the parking area 150 in block 620, the remote controller 192 receives the location information from the I/G unit 191 and determines from this information that the transport vehicle 160 is located in the parking area 150. The remote controller 192 responds to this information by sending instructions to the I/G unit 191 to switch to the low power mode. In the low power mode, the functionality of the I/G unit 191 is limited so as to not expend excess power and thereby prolong the battery life of the I/G unit 191. In some embodiments, the I/G unit 191 only transmits location information in the low power mode, and no other functionality (e.g., guidance functionality) is enabled.

In block 630, the transport vehicle 160 is hooked up to a tractor 161 and moved to the loading dock station 141 once it becomes available. As the transport vehicle 160 leaves the parking area 151 location information is transmitted by the I/G unit 191 to the remote controller 192, which processes this information and determines that the transport vehicle 160 has left the parking area 151. The remote controller 192 then transmits instructions to the I/G unit 191 to toggle into full power mode so that the I/G unit 191 becomes fully functional. In the fully functional state, the I/G unit 191 can transmit guidance information, such as video feed from the camera 221 and/or object proximity information from one or more of the sensors 223. The guidance information is received by the remote controller 192 and transmitted to the portable communications device 193 used by the driver maneuvering the transport vehicle 160. The guidance information assists the driver with aligning the transport vehicle 160 at the loading dock station 141.

In block 640, the transport vehicle 160 leaves the loading dock station 141 after loading or unloading is complete and proceeds toward the exit of the logistics yard 100. When the transport vehicle 160 arrives at the guard shack 130 of the logistics yard 100, the attendant removes the I/G unit 191 from the transport vehicle 160. In some embodiments, the removed I/G unit 191 is stored in the guard shack 130. Storage of the I/G unit 191 in the guard shack 130 can include docking the I/G unit 191 in a recharging station so that the I/G unit 191 is fully charged before subsequent use. Information transmitted to the remote controller 192 by the I/G unit 191 as it approaches the exit gate (e.g., location information) causes the remote controller 192 to send instructions to the I/G unit 191 to toggle to low power mode. Alternatively, the attendant at the guard shack can manually toggle the I/G unit 191 using the manual switch 227 to low power mode or even turn the I/G unit 191 off once it has been removed from the transport vehicle 160.

Although the method 600 described above includes a single parking step (i.e., between entering the logistics yard 100 and moving to the loading dock station 141), the method 600 may include other parking steps as necessary. For example, after being loaded or unloaded at the loading dock station 141, the transport vehicle 160 may require an additional parking step before leaving the logistics yard 100. In such embodiments, the parking step as described above can be repeated as necessary (e.g., location information transmitted by the I/G unit 191 indicating placement within a parking area 151 can result in the remote controller 192 instructing the I/G unit 191 to toggle to low power mode). Similarly, the method 600 described above may be altered when no parking is required (e.g., when the transport vehicle 160 can proceed directly to the loading dock station 141 upon entering the logistics yard 100). In such scenarios, the I/G unit 191 remains in full power mode so that the I/G unit 191 has full functionality (including guidance functionality) while being maneuvered around the logistics yard 100.

Figure 7:
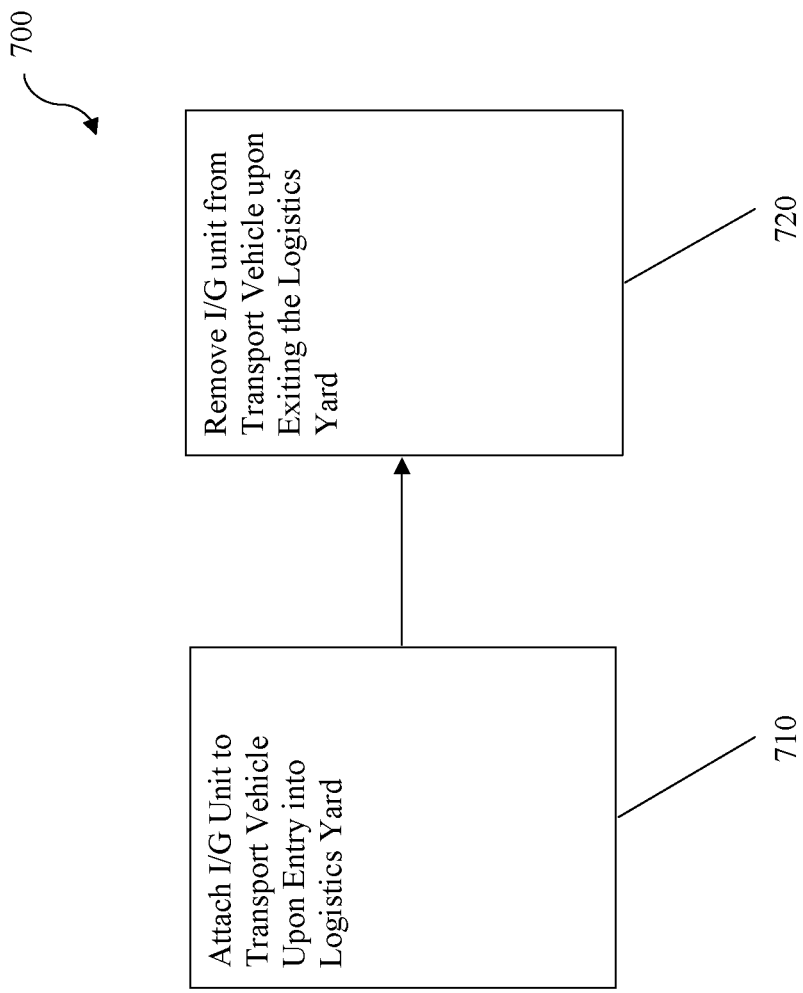
FIG. 7 is a flow chart illustrating an identification and guidance method configured in accordance with embodiments of the present technology.

FIG. 7 is a diagram illustrating a method 700 of operating a transport vehicle 160 in a logistics yard in accordance with embodiments of the present technology. The method 700 can be carried out using the identification and guidance system 190 as described above, including the 11G unit 191, the remote controller 192, and one or more of the portable communication devices 193.

In block 710, the transport vehicle 160 enters the logistics yard 100 and the I/G unit 191 is attached to the transport vehicle 160. As described above, the I/G unit 191 can include an attachment mechanism 211 for releasably attaching the I/G unit 191 to the transport vehicle, and the I/G unit 191 can be attached to the transport vehicle 160 by an attendant at the guard shack 130. In some embodiments, the I/G unit 191 is attached to a rear external surface of the transport vehicle 160. Once the I/G unit 191 is attached to the transport vehicle 160, the I/G unit 191 begins to transmit information to the remote controller 192 via the network. The I/G unit 191 can transmit information including, but not limited to, the location of the I/G unit 191. The I/G unit 191 can continue to transmit updated location information to the remote controller 192 throughout the time that the transport vehicle is located within the logistics yard 100.

As described above, the process of attaching the I/G unit 191 to the transport vehicle 160 can include entering the unique identifier 224 into the remote controller 192, entering identify information of the transport vehicle 160 to which the I/G unit is attached into the remote controller 192, and pairing the identifier information within the remote controller 192. This results in associating the I/G unit 191 with the transport vehicle 160 within the remote controller 192 so that any data, information, signals, etc., sent by the I/G unit 191 is associated with the transport vehicle 160 within the remote controller 192, For example, any location information transmitted by the I/G unit 191 and received by the remote controller 192 is automatically processed by the remote controller 192 as providing the location of the transport vehicle 160.

In block 720, the transport vehicle 160 exits the logistics yard 100 and the I/G unit 191 is removed from the transport vehicle 160. The attendant at the guard shack 130 can remove the I/G unit 191 from the transport vehicle when the transport vehicle 160 stops at the guard shack 130 prior to exiting the logistics yard 100. Because the I/G unit 191 is releasably attached to the transport vehicle 160, removing the I/G unit 191 is relatively easy. As described above, the removed I/G unit 191 may be recharged in the guard shack so that it is ready for further use upon entry of another transport vehicle 160 into the logistics yard 100.

The method 600 and embodiments thereof described above can be facilitated by the processor 301 of the remote controller 192 according to computer-executable instructions. Those skilled in the relevant art will appreciate that methods such as method 600 can be practiced with other computer system configurations, including Internet appliances, hand-held devices, wearable computers, cellular or mobile phones, multi-processor systems, microprocessor-based or programmable consumer electronics, set-top boxes, network PCs, mini-computers, local servers, cloud-based servers and the like. Methods can be embodied in a special purpose computer or data processor that is specifically programmed, configured or constructed to perform one or more of the computer-executable instructions explained in detail herein. Indeed, the term "computer" (and like terms), as used generally herein, refers to any of the above devices, as well as any data processor or any device capable of communicating with a network, including consumer electronic goods such as game devices, cameras, or other electronic devices having a processor and other components, e.g., network communication circuitry.

The method 600 and embodiments thereof can also be practiced in distributed computing environments, where tasks or modules are performed by remote processing devices, which are linked through a communications network, such as a LAN, WAN or the Internet. In a distributed computing environment, program modules or sub-routines may be located in both local and remote memory storage devices. Aspects of the methods described herein may be stored or distributed on computer-readable media, including magnetic and optically readable and removable computer discs, stored as in chips (e.g., EEPROM or flash memory chips). Alternatively, aspects of the routine may be distributed electronically over the Internet or over other networks (including wireless networks). Those skilled in the relevant art will recognize that portions of the method may reside on a server computer, while corresponding portions reside on a client computer. Data structures and transmission of data particular to aspects of the method are also encompassed within the scope of the invention.

Embodiments of the systems and methods described herein can be integrated into other systems used for managing logistics yards. For example, U.S. patent application Ser. No. 16/109,603, titled VEHICLE GUIDANCE SYSTEMS AND ASSOCIATED METHODS OF USE AT LOGISTICS YARDS AND OTHER LOCATIONS, the entirety of which is incorporated herein by reference, may be integrated with embodiments of the system described herein to facilitate management and guidance of transport vehicles located within the logistics yard. Guidance systems such as those described in U.S. patent application Ser. No. 16/109,603 can include sensors located throughout the logistics yard. These sensors are configured to provide guidance information to vehicles moving about the logistics yard to thereby improve movement of transport vehicles and avoid collisions. The I/G units as described herein can communicate with such sensors to thereby provide additional information to the remote controller and/or portable communications device and further assist with maneuvering transport vehicles about the logistics yard. The I/G units attached to the transport vehicles as described herein can also be used to provide, for example, location information to systems such as those described in U.S. patent application Ser. No. 16/109,603. Where autonomous vehicles are used for maneuvering trailers as described in U.S. patent application Ser. No. 16/109,603, the I/G units described herein can provide geolocation information such that autonomous vehicles can locate trailers to be moved and maneuver the trailers based on the information collected by the I/G units. In some embodiments, the autonomous vehicle maneuvering a trailer having an I/G unit attached thereto includes a personal communication device as described herein, with the personal communication device serving as or incorporating an autonomous guidance package that is responsible for autonomous movement of the vehicle (and as described in greater detail in U.S. patent application Ser. No. 16/109,603). In such embodiments, information transmitted by the I/G unit and received by the personal communication device can be used by the autonomous guidance package, along with other information, as part of determining where to direct the autonomous vehicle.

From the foregoing, it will be appreciated that specific embodiments of the invention have been described herein for purposes of illustration, but that various modifications may be made without deviating from the scope of the invention.

We claim:

1. A logistics yard identification and guidance system, comprising:
   an identification and guidance unit configured to be releasably attached to a transport vehicle, the identification and guidance unit comprising:
      at least one sensor configured to sense the proximity of an object to the identification and guidance unit, and to detect a location device and receive from the location device the location device's location and identity; and
      a transceiver;
   a portable communications device comprising:
      a display; and
      a transceiver; and
   a remote controller programmed with computer readable instructions that, when executed, cause the remote controller to:
      receive, from the identification and guidance unit via a wireless network, the object's proximity to the identification and guidance unit and at least one of the location device's location or the location device's identity; and
      transmit, to the portable communications device via the wireless network, the object's proximity to the identification and guidance unit and at least one of the location device's location or the location device's identity for display on the display of the portable communications device.

2. The logistic yard identification and guidance system of claim 1, wherein the display of the portable communications device is positioned in a cab of the transport vehicle for viewing by a vehicle operator.

3. The logistic yard identification and guidance system of claim 1, wherein the portable communications device is a handheld user device carried in a cab of the transport vehicle.

4. The logistics yard identification and guidance system of claim 1, wherein the wireless network is a local area network.

5. The logistics yard identification and guidance system of claim 1, wherein video data received by the remote controller and transmitted to the portable communications device is received and transmitted in real time.

6. The logistics yard identification and guidance system of claim 1, wherein the personal communication device comprises an autonomous guidance package configured to control movement of an autonomous vehicle.

7. The logistics yard identification and guidance system of claim 1, wherein the identification and guidance unit further comprises a positioning device configured to receive location data from an external positioning source and determine a transport vehicle location based on the location data.

8. The logistics yard identification and guidance system of claim 7, wherein the identification and guidance unit further comprises a camera configured to record video data, still image data, or both of a field of view extending outward from the identification and guidance unit.

9. The logistics yard identification and guidance system of claim 8, wherein the remote controller is further programmed with computer readable instructions that, when executed, cause the remote controller to:

receive, from the identification and guidance unit via a wireless network, at least one of the transport vehicle location, the video data, the still image data, or the other of the location device's location or the location device's identity; and transmit, to the portable communications device via the wireless network, at least one of the transport vehicle location, the video data, the still image data, or the other of the location device's location or the location device's identity for display on the display of the portable communications device.

10. The logistic yard identification and guidance system of claim 9, wherein the remote controller comprises a display configured to display at least one of the transport vehicle location, the video data, the still image data, the object's proximity, or the location device's location.

11. The logistic yard identification and guidance system of claim 10, wherein the transport vehicle location is displayed on the remote controller display in the form of a map of the logistics yard having displayed thereon the location of the transport vehicle.

12. A logistics yard identification and guidance system, comprising:
 identification and guidance unit configured to be releasably attached to a transport vehicle, the identification and guidance unit comprising:
  a positioning device configured to receive location data from an external positioning source and determine a transport vehicle ovation based on the location data;
  a camera configured to record video data, still image data, or both of a field of view extending outward from the identification and guidance unit;
  at least one sensor configured to sense the proximity of object to the identification and guidance unit, or to detect a location device and receive from the location device the location device's location or identity; and
  a transceiver;
 a portable communications device comprising:
  a display; and
  a transceiver; and
 a remote controller programmed with computer readable instructions that, when executed, cause the remote controller to:
  receive, from the identification and guidance unit via a wireless network, at least one of the transport vehicle location, the video data, the still image data, the object's proximity to the identification and guidance unit, the location device's location, or the location device's identity; and
  transmit, to the portable communications device via the wireless network, at least one of the transport vehicle location, the video data, the still image data, the object's proximity to the identification and guidance unit, or the location device's identity for display on the display of the portable communications device,
 wherein the remote controller comprises a display configured to display at least one of the transport vehicle location, the video data, the still image data, the object's proximity, or the location device's location,
 wherein the remote controller display is further configured to display the transport vehicle location in the form of a map of the logistics yard having displayed thereon the location of the transport vehicle, and wherein moving a cursor over, clicking on, or tapping on the transport vehicle displayed on the map displays information relating to the transport vehicle.

13. The logistics yard identification and guidance system of claim 12, wherein the information relating to the transport vehicle relates to contents of the transport vehicle.

14. The logistics yard identification and guidance system of claim 12, wherein the information relating to the transport vehicle is selected from the group consisting of a time of entry into the logistics yard of the transport vehicle, a driver assigned to the transport vehicle, a loading dock station assigned to the transport vehicle, and an elapsed time since the last movement of the transport vehicle.

15. The logistic yard identification and guidance system of claim 12, wherein the display of the portable communications device is configured to be positioned in a cab of the transport vehicle for viewing by a vehicle operator.

16. The logistic yard identification and guidance system of claim 12, wherein the portable communications device is a handheld user device.

17. The logistics yard identification and guidance system of claim 12, wherein the wireless network is a local area network.

18. The logistics yard identification and guidance system of claim 12, wherein the computer readable instructions, when executed, cause the remote controller to receive and transmit the video data to the portable communications device in real time.

19. The logistics yard identification and guidance system of claim 12, wherein the personal communication device comprises an autonomous guidance package configured to control movement of an autonomous vehicle.

* * * * *